(12) United States Patent
Tsai

(10) Patent No.: US 7,207,134 B1
(45) Date of Patent: Apr. 24, 2007

(54) ROTATING ARTIFICIAL BAIT STRUCTURE INSIDE BODY OF ARTIFICIAL BAIT

(76) Inventor: Tsung-Hsi Tsai, No.134, Jianping St., Changhua City, Changhua County 500 (TW)

( * ) Notice: Subject to any disclaimer, the term of this patent is extended or adjusted under 35 U.S.C. 154(b) by 0 days.

(21) Appl. No.: 11/274,138

(22) Filed: Nov. 16, 2005

(51) Int. Cl.
*A01K 85/00* (2006.01)

(52) U.S. Cl. .................................. 43/42.31; 43/42.12
(58) Field of Classification Search ............... 43/42.12, 43/42.16, 42.17, 42.31
See application file for complete search history.

(56) References Cited

U.S. PATENT DOCUMENTS

| | | | | |
|---|---|---|---|---|
| 2,629,960 A | * | 2/1953 | Baxter | 43/42.06 |
| 2,688,205 A | * | 9/1954 | Brown | 43/26.2 |
| 2,833,078 A | * | 5/1958 | Peltz | 43/42.31 |
| 3,340,643 A | * | 9/1967 | Weimer | 43/42.12 |
| 3,439,443 A | * | 4/1969 | Weimer | 43/42.12 |
| 3,757,455 A | * | 9/1973 | Strader | 43/42.14 |
| 5,870,850 A | * | 2/1999 | Gramse, Jr. | 43/42.31 |
| 5,924,236 A | * | 7/1999 | Preston | 43/42.31 |
| 6,301,822 B1 | * | 10/2001 | Zernov | 43/42.31 |
| 6,671,996 B1 | * | 1/2004 | Ito | 43/42.31 |

* cited by examiner

*Primary Examiner*—Kurt Rowan
(74) *Attorney, Agent, or Firm*—Troxell Law Office, PLLC

(57) ABSTRACT

A rotating artificial bait in body of artificial bait, it is put together with half-sectioned bait shell, isolated layers with proper room are formed inside, isolated layer and block & arc slot at center of shell can embed in tip of mandrel of passive vane and active rotating vane with mandrel, so that passive vane is built in middle of spacial groove, active rotating vane is fixed in two sides of shell so as to make a coaxial core but not communicating each other, in addition, put several ball beads inside spacial groove so that ball beads can move close to vane of passive vane, magnets are fixed at end of passive vane and active rotating vane respectively; these magnets can produce mutual magnetic attraction so that active rotating vane can drive passive vane to rotate synchronously and let vane of passive vane collide ball bead successively, the collision may produce sound frequency to attract fish and eye-like vivid effect, therefore, it may promote possibility of attracting big fish to eat bait.

3 Claims, 2 Drawing Sheets

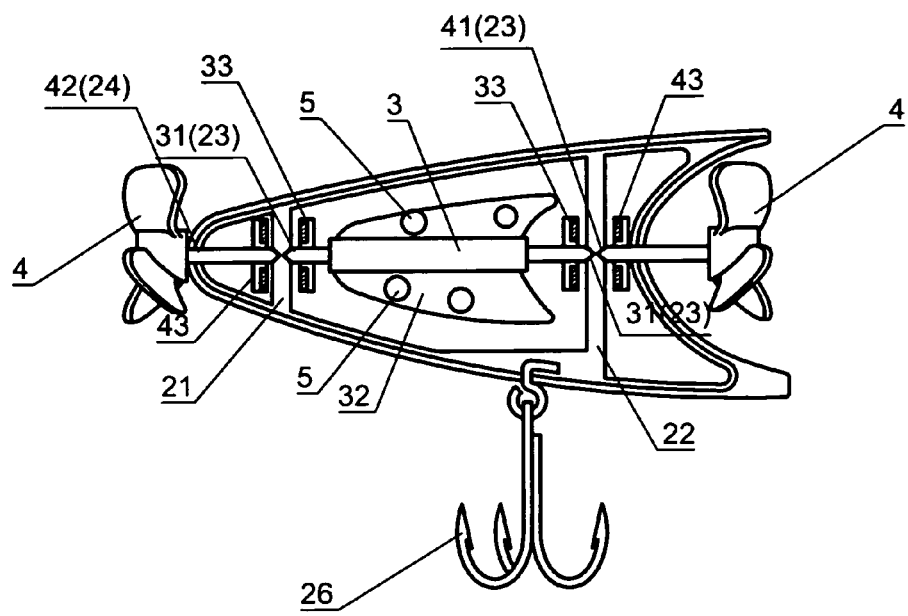
FIG. 2
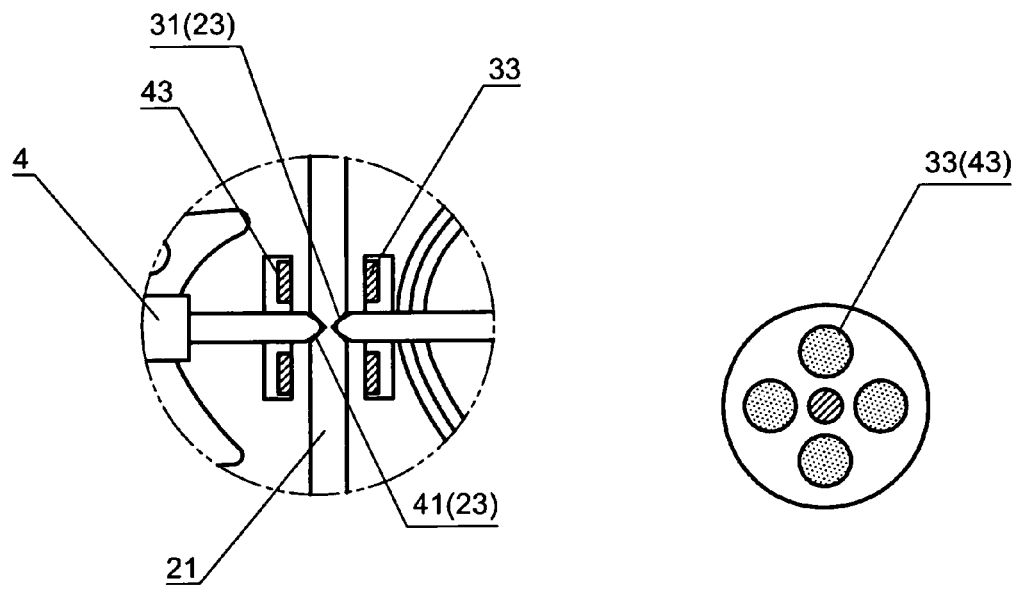
FIG. 3-A                    FIG. 3-B

ROTATING ARTIFICIAL BAIT STRUCTURE INSIDE BODY OF ARTIFICIAL BAIT

BACKGROUND OF THE INVENTION

1) Field of the Invention

This invention relates to rotating artificial bait structure inside the body of artificial bait.

2) Description of the Prior Art

Usually, "fishing" is a leisure sport suitable for everyone. It does not matter either it is brook fishing, lake fishing or sea fishing and boat fishing . . . , people can enjoy different landscapes in different fishing places so as to relax and obtain happiness from the pulling of different types of fish in freshwater or blue sea. Different water areas have their own type of fish, but the food chain cannot be broken (i.e., big fish eat the small ones), so, artificial bait in small fish shape is produced to induce the big fish to eat bait. According to the current invention, the artificial bait is designed in a fish shape. Veins and colors are drawn on body of bait, with a fish hook is fixed respectively at front and the rear of this bait for positioning fishing line so as to induce big fish. However, this type of artificial bait is to induce fish by its colorful veins on its body: its other parts are not flexible and life-like, therefore, fish may lack interest in this type of artificial bait (it is the common opinion of most fishermen), so, its inducing effect is not as good as required. As a result, fishermen waste lots of time and energy but do not get expected return (they cannot get as many fish as expected) and may lose interests in fishing accordingly.

SUMMARY OF THE INVENTION

I. Problem to Solve (A) Only colorful veins on bait body: the common artificial bait only applies the colorful veins on body to attract visual sights of fishes. Its function is simple, fish may not be induced because the colorful veins faded or the primitive color is distorted.

(B) Its appearance is not good as expected: its fish-shaped structure is too simple and quite different from body of real fish. Furthermore, it lacks a helpful special design, therefore, it may have no attraction to fish since its appearance is not vivid as required.

II. Solution

1. To provide the isolated layer and non-communicating mode so that no leakage may happen inside of shell, rotation of the built-in passive vane and continuous displacement of ball beads produces an artificial bait structure with life-like eyes, swimming pose and sound.

2. The mutual magnetic attraction of magnet group can drive the passive vane to rotate via the active rotator, the convolution can let vane stir ball bead continuously, so that another rotating artificial bait is formed inside the body of artificial bait which can produce dual attractions to induce fish.

3. The structure of this invention applies natural water flow, thereby forcing the active vane to rotate automatically, then control passive vane to convolute synchronously via attraction of magnetic force, so, it does not need any driving energy or power, its structure is simple and difficult to break.

4. The attractive magnetic force at the two ends can control the convolution of passive vane so that it can convolute equally and stably.

BRIEF DESCRIPTION OF THE DRAWINGS

FIG. 2 is the combination section drawing of a structure of this invention.

FIG. 3-A is the positioning detailed drawing of active rotating vane and passive vane of this invention.

FIG. 3-B is the end view of magnet of this invention.

DETAILED DESCRIPTION OF THE INVENTION

Figure 1:
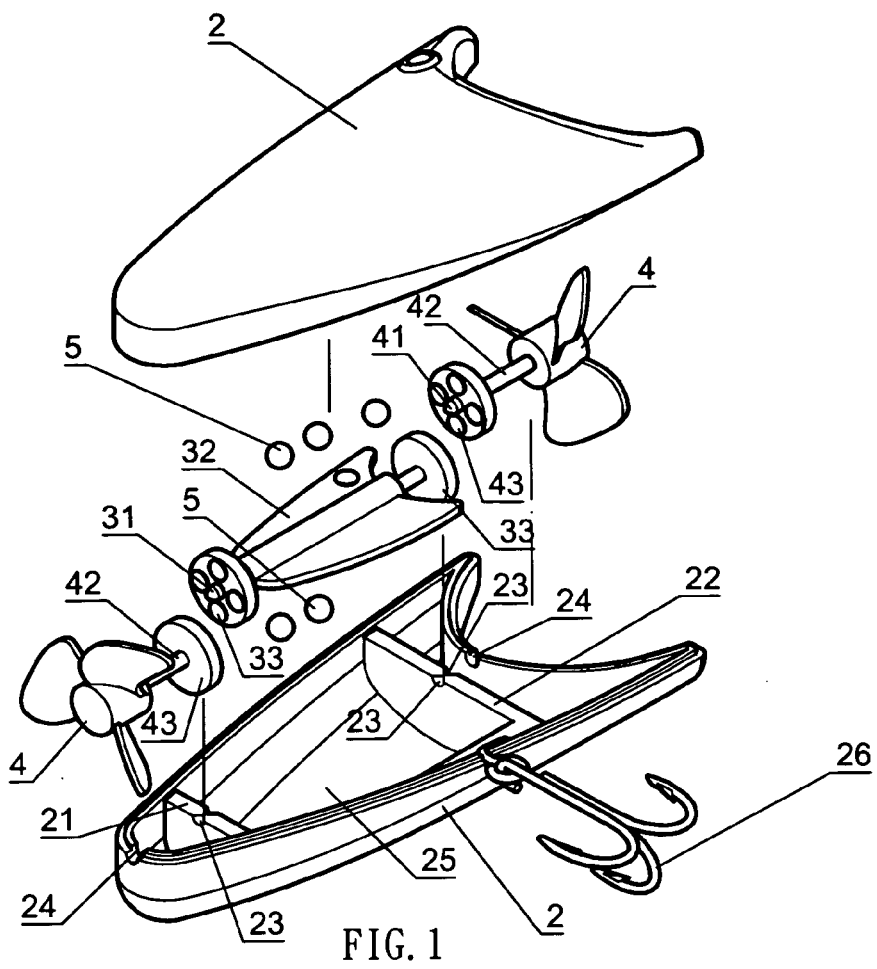
FIG. 1 is the exploded view of a structure of this invention.
Figure 3:
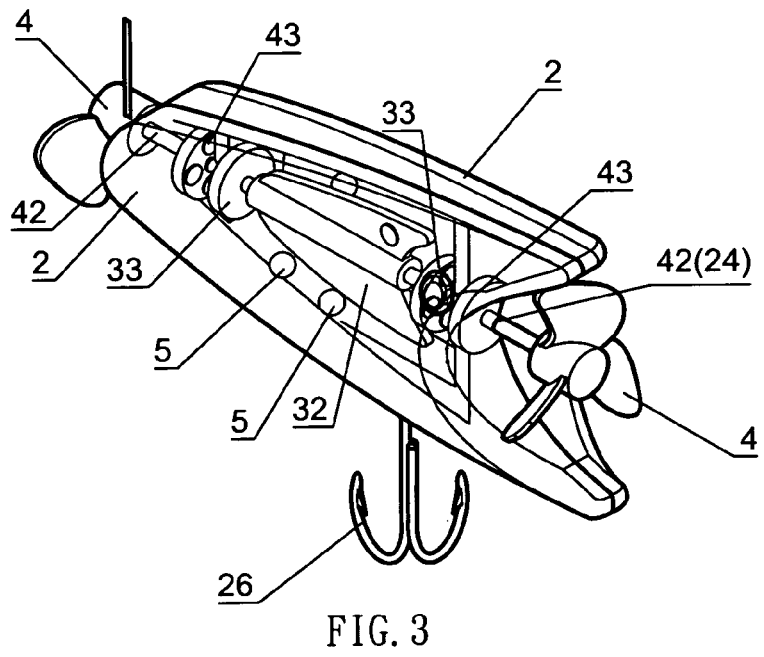
FIG. 3 is the three-dimensional combination drawing of a structure of this invention.

Structure and application examples of this invention are herein described in the following, please refer to FIG. 1, FIG. 2, FIG. 3, FIG. 3-A and FIG. 3-B.

This invention is put together with half-sectioned bait shell 2, isolated layer 21 & 22 with proper room are formed inside, isolated layer 21 & 22, block slot 23 and arc slot 24 at center of shell can embed tip of mandrel 31 & 41 of passive vane 3 and active rotating vane 4 with mandrel 42 (refer to FIG. 3-A) so that passive vane 3 is built in middle of spacial groove 25. Active rotating vane 4 is fixed in two sides of shell body 2 so as to make a coaxial core but not communicating each other. In addition, several ball beads 5 are placed inside spacial groove 25 so that ball beads 5 can move close to vane 32 of passive vane 3, magnet 33 and 43 are fixed at end of passive vane 3 and active rotating vane 4 respectively (as shown in FIG. 3-B). This structure may activate rotating vane which is driven to rotate by the pressure of water flow, based on the attractive magnetic force produced by the closeness of magnet 33 and 43, active rotating vane 4 can drive passive vane 4 to rotate synchronously so as to let vane 32 of passive vane 3 collide ball bead 5 successively. This collision can produce sound frequency to attract fish and also produce an illusion of life-like eyes through a vivid rotation effect. Therefore, the fish hook 26 fixed at outside of bait body can be used so as to promote possibility of attracting big fish to eat bait.

To sum up all above descriptions, this invention can indeed improve the performance of artificial bait, and also offers visual and sound frequency imitation. Therefore, it is in conformity with guideline of a new patent.

What is claimed is:

1. A rotating artificial bait structure inside a body of artificial bait, comprising:

a bait shell formed by two half-sectioned bait shells having a least one isolated layer subdividing the interior formed by the bait shell to form a spatial groove, the bait shell further comprising a block slot fixed in the center of at least one isolated layers and an arc slot being formed in the bait shell;

at least one passive vane embedded with a tip in the block slot with a magnet being fixed on at least one respective end of the passive vane so that the passive vane is located in the spacial groove;

at least one active rotating vane with a mandrel extending into the shell through the arc slot, the mandrel further extending into the block slot, the active rotating vane having another magnet located on the mandrel in a position to allow the rotation of the active rotating vane to drive the rotation of the passive vane through magnetic attraction;

a plurality of ball beads located in the spatial groove being configured to collide successively to produce a sound frequency to attract fish through the rotation of the active rotating vane which drives the passive vane to rotate synchronously.

2. The rotating artificial bait structure as claimed in claim 1, wherein the bait shell is conic-shaped.

3. The rotating artificial bait structure as claimed in claim 1, wherein the bait shell is transparent.

* * * * *